(12) United States Patent
Chakra et al.

(10) Patent No.: US 10,007,954 B2
(45) Date of Patent: *Jun. 26, 2018

(54) MANAGING AN INITIAL POST ON A WEBSITE

(71) Applicant: International Business Machines Corporation, Armonk, NY (US)

(72) Inventors: Al Chakra, Apex, NC (US); Liam Harpur, Dublin (IE); John Rice, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/974,286

(22) Filed: Aug. 23, 2013

(65) Prior Publication Data

US 2015/0058750 A1    Feb. 26, 2015

(51) Int. Cl.
| | |
|---|---|
| G06Q 50/00 | (2012.01) |
| G06F 17/27 | (2006.01) |
| G06Q 10/00 | (2012.01) |
| H04L 29/06 | (2006.01) |

(52) U.S. Cl.
CPC ........... G06Q 50/01 (2013.01); G06F 17/277 (2013.01); G06Q 10/00 (2013.01); H04L 65/403 (2013.01)

(58) Field of Classification Search
CPC ...... G06F 17/277; G06F 17/218; G06Q 50/01
See application file for complete search history.

(56) References Cited

U.S. PATENT DOCUMENTS

| | | | |
|---|---|---|---|
| 6,618,751 B1* | 9/2003 | Challenger et al. | 709/213 |
| 8,611,929 B1* | 12/2013 | Vandehey | H04W 4/02 455/456.3 |
| 9,148,392 B1* | 9/2015 | Kelly | H04L 51/00 |
| 9,754,051 B2* | 9/2017 | Bastide | G06F 17/3097 |
| 2008/0162510 A1* | 7/2008 | Baio | G06Q 30/02 |
| 2008/0208566 A1* | 8/2008 | Alonichau | G06F 17/2755 704/9 |
| 2009/0089804 A1* | 4/2009 | Beadle et al. | 719/318 |
| 2009/0235253 A1* | 9/2009 | Hope | G06Q 10/10 718/100 |
| 2010/0262597 A1* | 10/2010 | Han | G06F 17/30864 707/723 |
| 2011/0078167 A1* | 3/2011 | Sundaresan et al. | 707/765 |
| 2012/0005221 A1* | 1/2012 | Ickman et al. | 707/769 |
| 2013/0013683 A1 | 1/2013 | Elliott | |
| 2013/0268962 A1* | 10/2013 | Snider | H04N 21/8547 725/32 |
| 2014/0222911 A1* | 8/2014 | Haugen et al. | 709/204 |
| 2014/0282101 A1* | 9/2014 | Beechuk et al. | 715/753 |
| 2014/0316766 A1* | 10/2014 | Bao et al. | 704/9 |
| 2014/0337012 A1* | 11/2014 | Bastide et al. | 704/9 |
| 2014/0351257 A1* | 11/2014 | Zuzik | 707/740 |
| 2015/0052199 A1* | 2/2015 | Brooks et al. | 709/204 |
| 2015/0052201 A1* | 2/2015 | Brooks et al. | 709/204 |

* cited by examiner

*Primary Examiner* — Ryan Barrett (74) *Attorney, Agent, or Firm* — Fabian VanCott; Steven L. Nichols (57) ABSTRACT

Managing an initial post on a website includes identifying an initial post on website where the initial post is for an event, identifying a related post that describes the event after the event occurs, and updating the initial post to include content of the related post.

18 Claims, 8 Drawing Sheets

Event Library 400

| Event(s) 402 | Event Location(s) 404 | Event Date(s) 406 | Event Expiration Date(s) 408 | Related post(s) 410 | Content Of Related post(s) 412 | Update Date(s) 414 |
|---|---|---|---|---|---|---|
| Event 1 402-1 | Dublin 404-1 | May 1st 8:00 pm 406-1 | Midnight May 1st 408-1 | Forum 410-1 | Contents Of The Forum 412-1 | Midnight May 2nd 414-1 |
| Event 2 402-2 | New York 404-2 | May 15th 9:00 am to 10:00 am 406-2 | 10:00 am May 15th 408-2 | Blog, Instant Chat 410-2 | Contents Of The Blog and The Instant Chat 412-2 | Depends On Related Posts 414-2 |
| Event 3 402-3 | Washington D.C. 404-3 | June 10th 3:30 pm to 5:00 pm 406-3 | 5:00 pm June 10th 408-3 | Social Media Website 410-3 | Contents Of The Social Media Website 412-3 | After One Related Post is Identified 414-3 |

MANAGING AN INITIAL POST ON A WEBSITE

BACKGROUND

The present invention relates to managing an initial post on a website, and more specifically, to updating the initial post to include content of a related post.

Networks are used by user devices to transmit, access, upload, and retrieve information such as posts that are stored on servers. A website may use servers to store posts, such as news articles, updates from social network services and emails. A user will employ a user device to access a website to transmit, access, upload, and retrieve the posts stored on the website. Further, posts are often written for events that will happen in the future such as music concerts, astronomical events, political events, and scheduled sporting events, among other types of events. By viewing these posts, a user is able to be aware of news and events that will occur in the future.

BRIEF SUMMARY

A method for managing an initial post on a website includes identifying an initial post on a website where the initial post is for an event, identifying a related post that describes the event after the event occurs, and updating the initial post to include content of the related post.

A method for managing an initial post on a website includes identifying an initial post on a website where the initial post is for an event, determining an event expiration date for the event, determining an update date to update the initial post, identifying a related post that describes the event after the event occurs, recognizing that the update date is expired, and updating the initial post to include content of the related post.

A method for managing an initial post on a website includes identifying an initial post on a website where the initial post is for an event, and identifying a related post that describes the event after the event occurs.

A computer program product includes a computer readable storage medium, the computer readable storage medium having computer readable program code embodied therewith. The computer readable program code having computer readable program code to identify an initial post on a website where the initial post is for an event, identify a related post that describes the event after the event occurs, and update the initial post to include content of the related post.

A system for managing an initial post on a website includes an initial post identification engine to identify an initial post on a website where the initial post is for an event, an update date determining engine to determine an expiration date for the event, a related post identification engine to identify a related post that describes the event after the event occurs, a recognizing engine to recognize that the update date is expired, and an updating engine to update the initial post to include content of the related post.

A system for managing an initial post on a website includes an initial post identification engine to identify an initial post on a website where the initial post is for an event, and a related post identification engine to identify a related post that describes the event after the event occurs.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for managing an initial post on a website or other site such that the initial post is updated to include content of a related post after an event occurs.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, posts are often written for events that will happen in the future such as music concerts, astronomical events, political events, and scheduled sporting events, among other types events. By accessing these posts, a user made aware of news and events that will occur. The posts that are written for events that will happen in the future expire when the event passes. As a result, a post for an event that has already occurred may lead to users wanting to view an update about the event.

To make sure a post is up-to-date, the original post may be manually removed from a server on the network and manually updated by rewriting the post to include updated information about the event. Once the post is manually updated, the post is uploaded to the server on the network. Manually updating posts on a server on the network can be a burdensome task. As a result, an organization having a large number of posts to update may have difficulty meeting the time demands to manually update the posts.

The principles described herein include a system and a method for managing an initial post on a website. Such a method includes identifying an initial post on a website where the initial post is for an event, identifying a related post that describes the event after the event occurs, and updating the initial post to include content of the related post. Such a method allows an initial post to be updated automatically to include content of a related post. As a result, a user does not have to manually update the initial post to include information that describes the event after the event occurs.

Further, the method can include creating an event entry for an event in an event library such that the event library associates the event entry with the event, an event location, an event date, an event expiration date, a related post, an update date, or combinations thereof. Creating an event entry for an event in an event library will be described in more detail below.

A website may be a set of related web pages that are stored on a server. For example, a website may be a blog, a social media website, a forum website, an instant chat website, other websites, or combinations thereof.

An initial post may be a first post that a user uploads to a website. Further, the initial post is for an event that will take place in the near future.

A related post may be a post that describes the event in the initial post. Further, the related post describes the event after the event occurs. In one example, the related post may be obtained from a number of websites. For example, a blog, a social media website, a forum website, an instant chat website, other websites, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
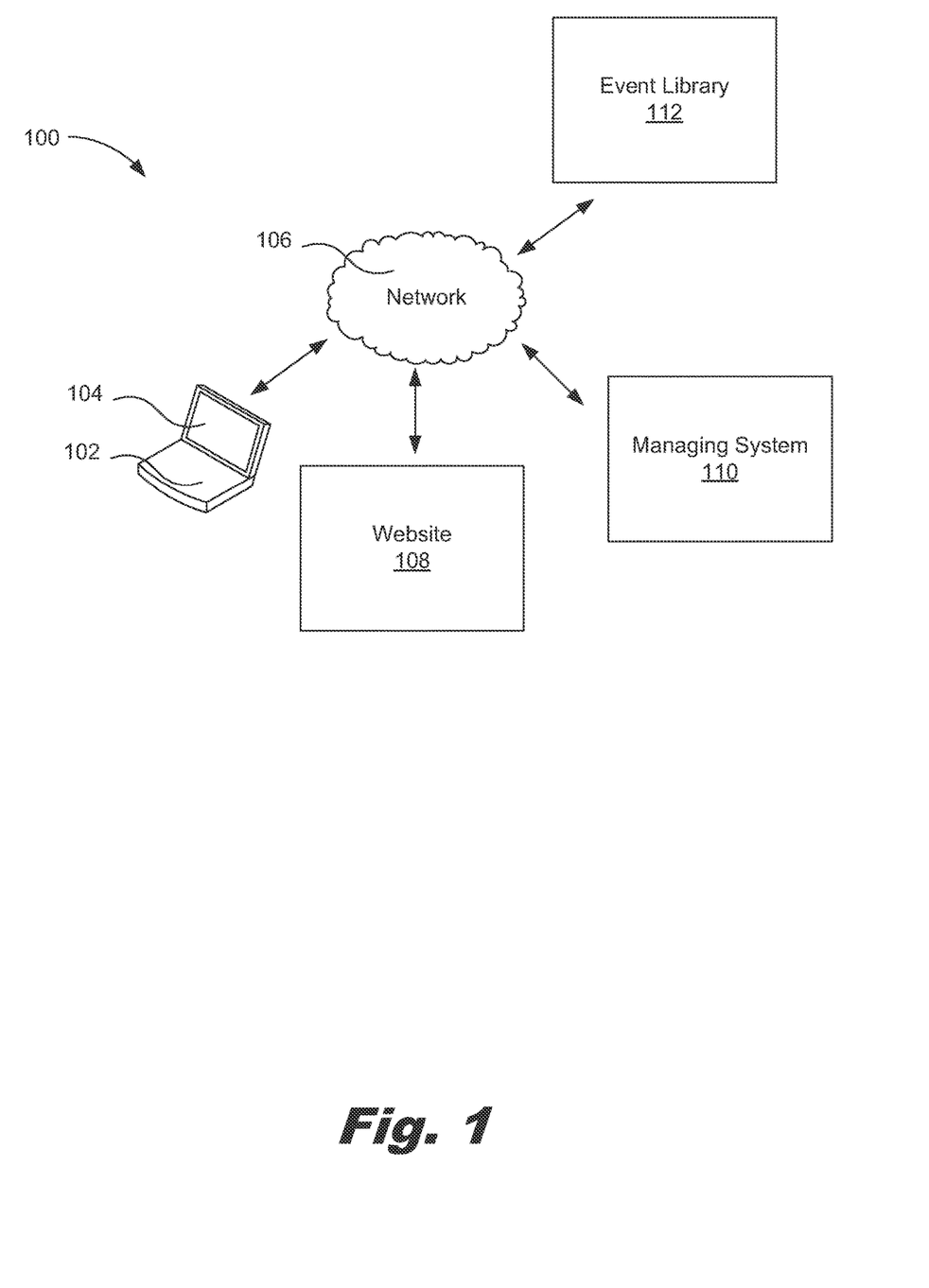
FIG. 1 is a diagram of an example of a system for managing an initial post on a website, according to one example of principles described herein.

Referring now to the figures, FIG. 1 is a diagram of an example of a system for managing an initial post on a website, according to one example of principles described herein. As will be described below, a managing system is in communication with a network to monitor an initial post that may be viewed on a display on a user device. Further, the managing system updates the initial post to include content of a related post after an update date of the initial post expires.

As mentioned above, the system (100) includes a user device (102) with a display (104). In one example, a user uses the user device (102) to access a network (106). In one example, the network (106) may include a website (108). In this example, the website (108) stores, in memory, a social network service. In keeping with the example, the social network service includes an activity stream to display initial posts shared by other users. As a result, the display (104)

displays initial posts from the website (108). As will be described below, an initial post is updated to include content of a related post after an update date of the initial post expires.

The system (100) further includes a managing system (110). In keeping with the given example, the managing system (110) updates an initial post to include content of a related post after an update date of the initial post expires. As will be described below, the managing system (110) identifies an initial post on a website (108) where the initial post is for an event. The managing system (110) identifies a related post that describes the event after the event occurs. In one example, the related post are retrieved the website (108), a blog, an instant chat, a forum, or combinations thereof. The managing system (110) updates the initial post to include content of the related post. As a result, a user does not have to manually update the initial post to include information that describes the event after the event occurs. The managing system (110) will be described in more detail below.

Further, the managing system (110) creates an event entry for the event in an event library (112). As will be described in later parts of this specification, the event library (112) stores, in memory, a number of event entries. In one example, the event entries include information such as events, event location, event date, event expiration date, related posts, content of related posts, update date, or combinations thereof. In this example, the managing system (110) references the event library (112) to update an initial post to include content of a related post after an update date of the initial post expires. The event library (112) will be described in more detail below.

While this example has been described with reference to the managing system being located over the network, the managing system may be located in any appropriate location according to the principles described herein. For example, the managing system may be located in a user device, a server, or combinations thereof. Further, the event library may be located in the managing system, a server, a user device, or combinations thereof. In some examples, the managing system updates an initial post to include content of one related post after an update date of the initial post expires. In other examples, the managing system updates an initial post to include content of multiple related posts after an update date of the initial post expires.

Figure 2:
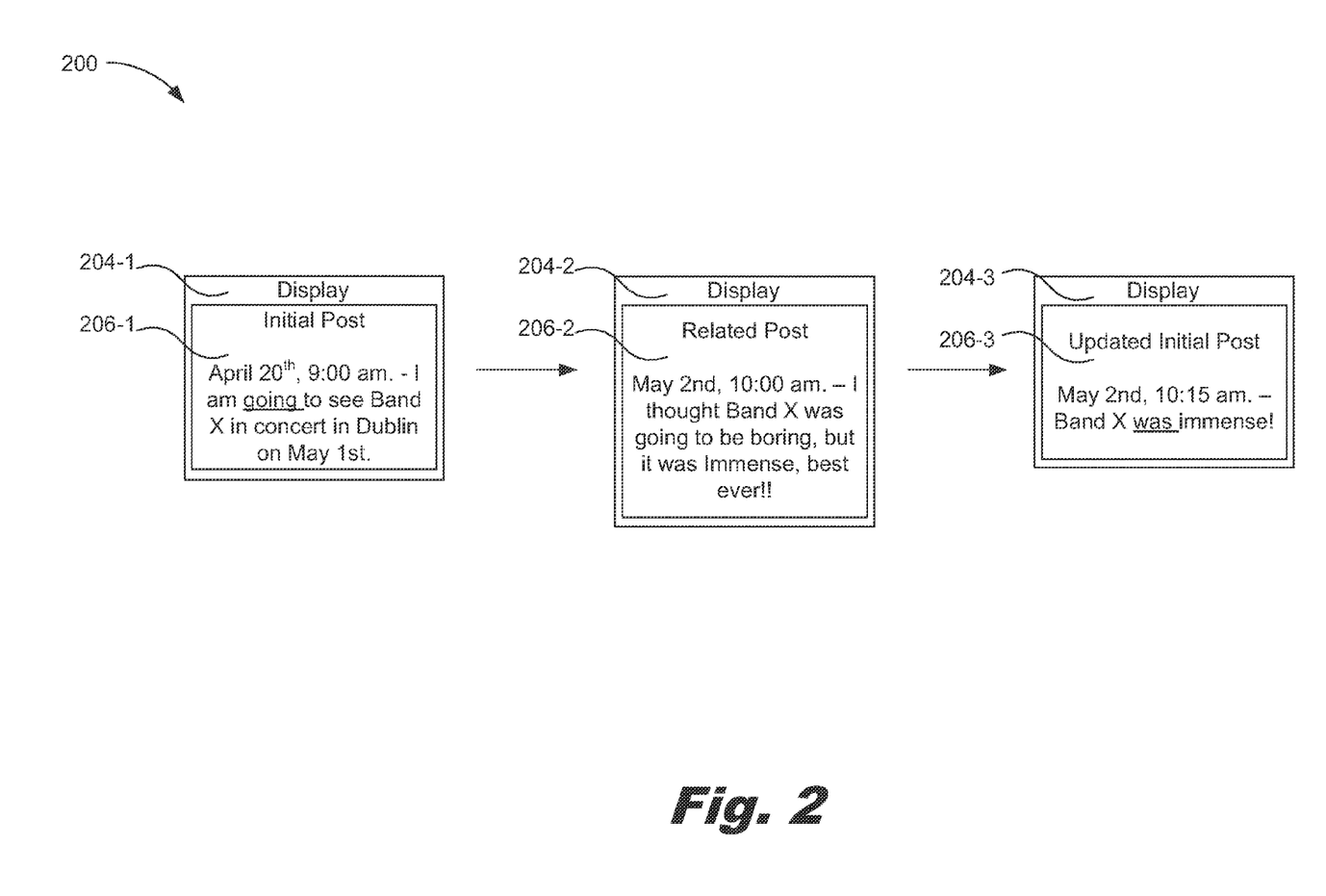
FIG. 2 is a diagram of an example for managing an initial post on a website, according to one example of principles described herein.

FIG. 2 is a diagram of an example for managing an initial post on a website, according to one example of principles described herein. As mentioned above, a user uses a user device (FIG. 1, 102) to access a network (FIG. 1, 106). Further, a display (FIG. 1, 104) on the user device (FIG. 1, 102) is used to display initial posts from the website (FIG. 1, 108). Further, a managing system (FIG. 1, 110) updates the initial post to include content of a related post after an update date of the initial post expires. As will be described below, updating an initial post after the update date of the initial post expires includes adding content of a related post to the initial post.

Turning specifically to FIG. 2, a display (204) on a user device (FIG. 1, 102) is used to display initial posts from the website (FIG. 1, 108). In one example, a user posts an initial post (206-1) in a display (204-1) that states, "I am going to see Band X in concert in Dublin on May 1st". Further, the initial post (206-1) was posted on a website, such as a social network service, on April $20^{th}$ at 9:00 am. As a result, the initial post (206-1) describes an event, a Band X concert, which will take place in the future, May 1st. In this example, a managing system FIG. 1, 110) identifies the event, the event location, the event date, and an event expiration date for the initial post. In this example, "Band X" is identified by the managing system (FIG. 1, 110) to be the event of the initial post (206-1). Further, "Dublin" is identified by the managing system (FIG. 1, 110) to be the location of the event. Still Further, "May $1^{st}$" is identified by the managing system (FIG. 1, 110) to be the date of the event for the initial post (206-1). Even still further, the managing system (FIG. 1, 110) may identify the event expiration date for the initial post (206-1) as Midnight May 1st. In this example, the managing system (FIG. 1, 108) uses data mining as well as other techniques to extract the information from the initial post (206-1) to create an event entry. As will be described in FIG. 4, the managing system (FIG. 1, 108) references an event library to store the initial post's information in the event library as an event entry.

In keeping with the given example, the user accesses the website one day later. The managing system FIG. 1, 110) determines that event expiration date for the initial post is expired. As a result, the managing system (FIG. 1, 110) monitors other posts made by the user to determine of the other posts are related to the initial post. In this example, the user makes a related post (206-2), on a blog, which states, "I thought Band X was going to be boring, but it was immense, best ever!!" As will be described in FIG. 4, the managing system (FIG. 1, 110) references the event library to determine that the related post (206-2) is related to the initial post (206-1). In this example, the related post (206-2) is related to the initial post (206-1). As a result, the related post (206-2) is stored in the event library.

In keeping with the given example, the managing system (FIG. 1, 110) updates the initial post (206-1) to include content of the related post (206-2) after an update date has expired. Further, the managing system may update the initial post (206-1) such that the verb tense for verbs in the initial post (206-1) are updated to a past verb tense. Further, the managing system (FIG. 1, 110) references a user characteristic database. As will be described below, the user characteristic database includes characteristics of a user associated with an event entry. As a result, an initial post may be updated to include the style and word choice that a user may use to update their initial post. For example, an updated initial post (206-3) may state, "Band X was immense!" Thus, the updated initial post (206-3) allows other user to see an update on the initial post.

While this example has been described with reference to the managing system updating an initial post using one related post, the managing system may update an initial post using multiple related posts. For example, the initial post may be updated after the managing system identifies at least two related posts.

Figure 3:
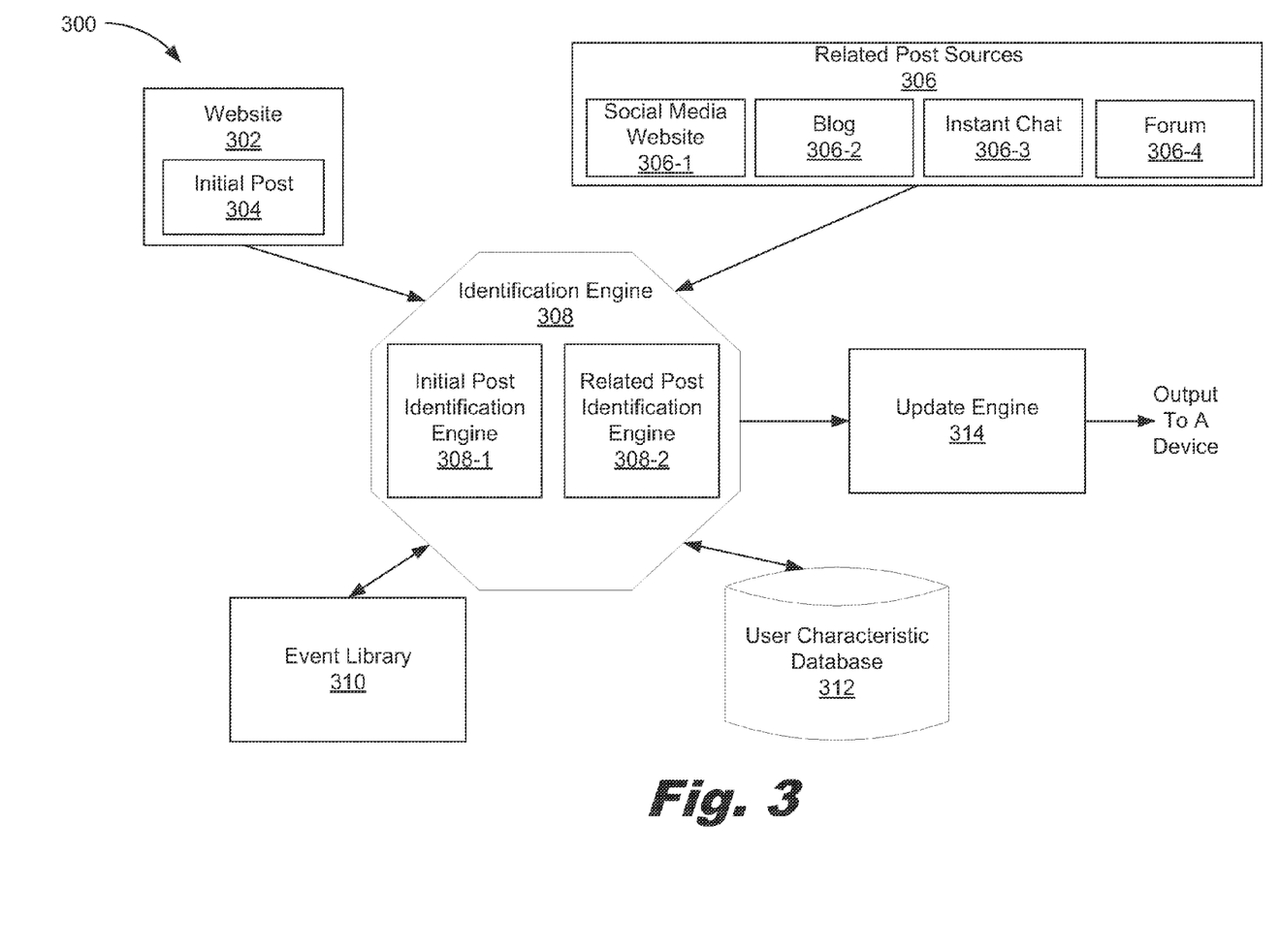
FIG. 3 is a diagram of an example of a managing system, according to one example of principles described herein.

FIG. 3 is a diagram of an example of a managing system, according to one example of principles described herein. As mentioned above, the managing system (FIG. 1, 110) updates an initial post to include content of the related post after the initial post's update date has expired. As will be described below, the related post may come from a number of related post sources. Further, a user characteristic database is referenced to associate characteristics of a user with an event entry stored in an event library for the initial post. As a result, the initial post is updated to include content of the related post after the initial post's update date has expired.

The managing system (FIG. 1, 110) includes an identification engine (308). In one example, the identification engine (308) includes an initial post identification engine (308-1) to identify an initial post (304) on a website (302)

where the initial post (304) is for an event. In one example, the initial post (304) is about a concert. As a result, the identification engine (308) stores the initial post (304) in an event library (310). As will be described in later parts of this specification, the event library (310) includes event entries for an initial post that include events, the event location, the event date, an event expiration date, related posts, content of related posts, an update date, or combinations thereof.

Further, the identification engine (308) includes a related post identification engine (308-2). In one example, the related post identification engine (308-2) identifies a related post that describes the event after the event occurs. In this example, the related post identification engine (308-2) monitors related post sources (306). In this example, the related post sources (306) may include a social media website (306-1) source, a blog (306-2) source, an instant chat (306-3) source, a forum source (306-4) source, other sources, and combinations thereof. In one example, the related post identification engine (308-2) identifies one related post from the related post sources (306). In another example, the related post identification engine (308-2) identifies multiple related posts from the related post sources (306). As a result, the identification engine (308) stores the related post from the related post sources (306) in the event library (310). Further, the event library (310) includes the related posts that are associated with the initial post and the contents of the related posts.

The managing system (FIG. 1, 110) further, includes a user characteristic database (312). In one example, the identification engine (308) references the user characteristic database (312) when updating an initial post. In one example, the user characteristic database (312) includes characteristics of a user associated with an event entry. For example, the style or word choices that a user may use to update their initial post. In this example, the user characteristic database (312) includes a user's favored words, favored style, favored n-grams, favored terms, favored numbers, favored structures from the field of natural process language, favored symbols, favored phrases, or combinations thereof. As a result, an initial post may be updated to include the style and word choice that a user may use to update their initial post.

As mentioned above, the managing system (FIG. 1, 110) further includes an updating engine (314). The managing system (FIG. 1, 110) recognizes that the update date is expired for an initial post (304). As a result, the initial post (304) is updated to include content of a related post after an update date of the initial post expires. In this example, the updating engine (314) updates an initial post to include content of a related post after an update date of the initial post expires. In one example, updating the initial post may include adding user's favored words, favored style, favored n-grams, favored terms, favored numbers, favored structures from the field of natural process language, favored symbols, favored phrases, or combinations thereof to the initial post. Further, the initial post is updated to include the contents of the related post for the event. As a result, an initial post is updated to include content of a related post in the style and word choice of the user.

Figure 4:
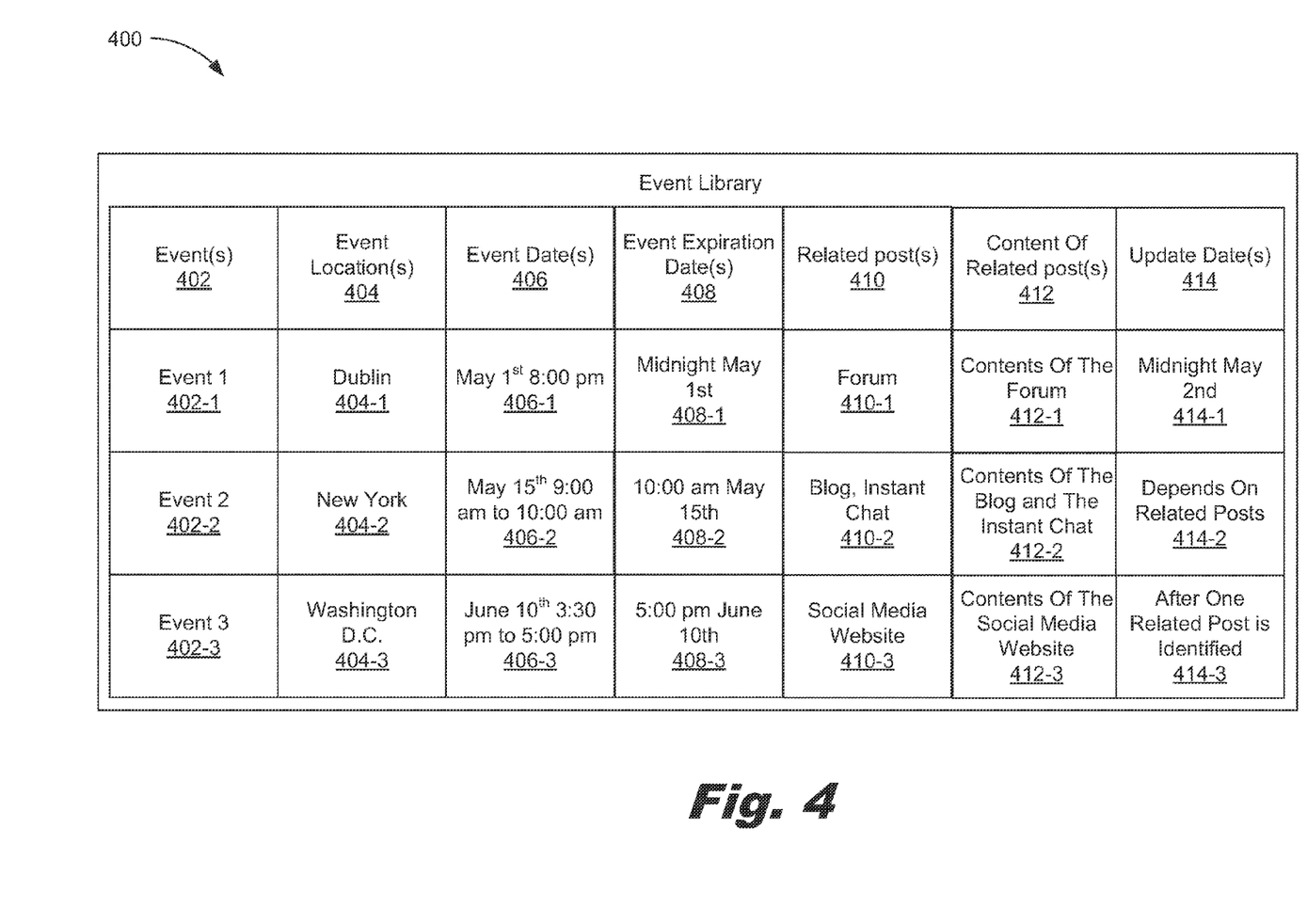
FIG. 4 is a diagram of an example of an event library, according to the principles described herein.

FIG. 4 is a diagram of an example of an event library, according to the principles described herein. As mentioned above, the managing system (FIG. 1, 110) references an event library (400) of events (402) for initial posts that will happen in the future. The event library (400) includes event entries for an initial post that include events (402), the event location (404), the event date (406), and the event expiration date (408) for the initial post. The event library (400) further includes related posts (410) that are associated with the initial post, contents of the related posts (412), and an update date.

Turning specifically to FIG. 4, the event library (400) includes events (402) such as event 1 (402-1), event 2 (402-2), and event 3 (402-3). Although this event library (400) includes three events (402), in practice an event library may contain more than three events. Further, the events (402) in the event library (400) have an event location (404) associated with each event. For example, event 1 (402-1) has an event location of Dublin (404-1), event 2 (402-2) has an event location of New York (404-2) and event 3 (402-3) has an event location of Washington D.C. (404-3). As mentioned above, the events (402) in the event library (400) has an event date (406) associated with each event. For example, event 1 (402-1) has an event date of May $1^{st}$ 8:00 pm (406-1), event 2 (402-2) has an event date of May $15^{th}$ 9:00 am to 10:00 am (406-2), and event 3 (402-3) has an event date of June $10^{th}$ 3:30 pm to 5:00 pm (406-3).

Further, the events (402) in the event library (400) has an event expiration date (408) associated with each event. For example, event 1 (402-1) has an event expiration date of midnight May $1^{st}$ (406-1), event 2 (402-2) has an event expiration date of 10:00 am May $15^{th}$ (406-2), and event 3 (402-3) has an event expiration date of 5:00 pm June $10^{th}$ (406-3). As mentioned above, after the event expiration date (408) expires, the managing system (FIG. 1, 110) monitors related post sources to identify a related post for an initial post.

Further, the events (402) in the event library (400) has an update date (414) associated with each event. For example, event 1 (402-1) has an update date of midnight May 2nd (414-1), event 2 (402-2) has an update date that depends on related posts (406-2), and event 3 (402-3) has an update date of after one related post is identified (406-3).

In this example, after midnight May $2^{nd}$, event 1 (402-1) exceeds the event expiration date (408-1) and is no longer valid. As mentioned above, the managing system (FIG. 1, 110) monitors the user's activity and identifies related posts after an event occurs. In one example, for event 1 (402-1), the managing system (FIG. 1, 110) identifies one related posts. In this example, the related post is from a forum (410-1). As a result, the forum (410-1) and the contents of the forum (412-1) are stored in the event library (400). In one example, the forum (410-1) may be stored as a link to the web page containing the forum. In another example, the entire forum (410-1) is stored in the event library (400). As mentioned above, the managing system (FIG. 1, 110) updates the initial post to include the contents of the forum (412-1) after the update date (414) expires. In this example, the initial post is updated at midnight May $2^{nd}$ (414-1).

In another example, after 10:00 am May $15^{th}$, event 2 (402-2) exceeds the event expiration date (408-2) and is no longer valid. As mentioned above, the managing system (FIG. 1, 110) monitors the user's activity and identifies related posts from a number of related post sources. In one example, for event 2 (402-2), the managing system (FIG. 1, 110) identifies two related posts. In this example, the related posts are from a blog and instant chat (410-2). In this example, the blog and instant chat (410-2) and the contents of the blog and instant chat (412-2) are stored in the event library (400). As mentioned above, the managing system (FIG. 1, 110) updates the initial post to include the contents of the blog and instant chat (412-2) after the update date (414) expires. In this example, the update date depends on related posts (414-2). For example, if there are multiple related posts for initial post, the managing system (FIG. 1, 110) may set the update date (414-2) to update the initial post after the managing system (FIG. 1, 110) is able to determine an overall attitude of the user for the related posts. For example, a first related post may indicate that the user's attitude towards event 23 (402-2) is neutral. Further, a second related post may indicate that the user's attitude towards event 23 (402-2) is slightly positive. Still further, a third related post may indicate that the user's attitude towards event 23 (402-2) is positive. As a result, the update date (414-2) may be determined after a third related post is identified.

In another example, if the update date depends on the related posts, the managing system (FIG. 1, 110) may determine that if an initial post has a negative user attitude and a first related post has a negative user attitude, the update date (414-2) may be after the first related post is identified.

In yet another example, after 5:00 am June 10$^{th}$, event 3 (402-3) exceeds the event expiration date (408-3) and is no longer valid. As mentioned above, the managing system (FIG. 1, 110) monitors the user's activity and identifies related posts. In one example, for event 3 (402-3), the managing system (FIG. 1, 110) identifies one related post. In this example, the related post is from a social media website (410-3). In this example, the social media website (410-3) and the contents of the social media website (412-3) are stored in the event library (400). As mentioned above, the managing system (FIG. 1, 110) updates the initial post to include contents of social media website (412-3) after the update date (414) expires. In this example, the initial post is updated after one related post is identified (414-3).

Figure 5:
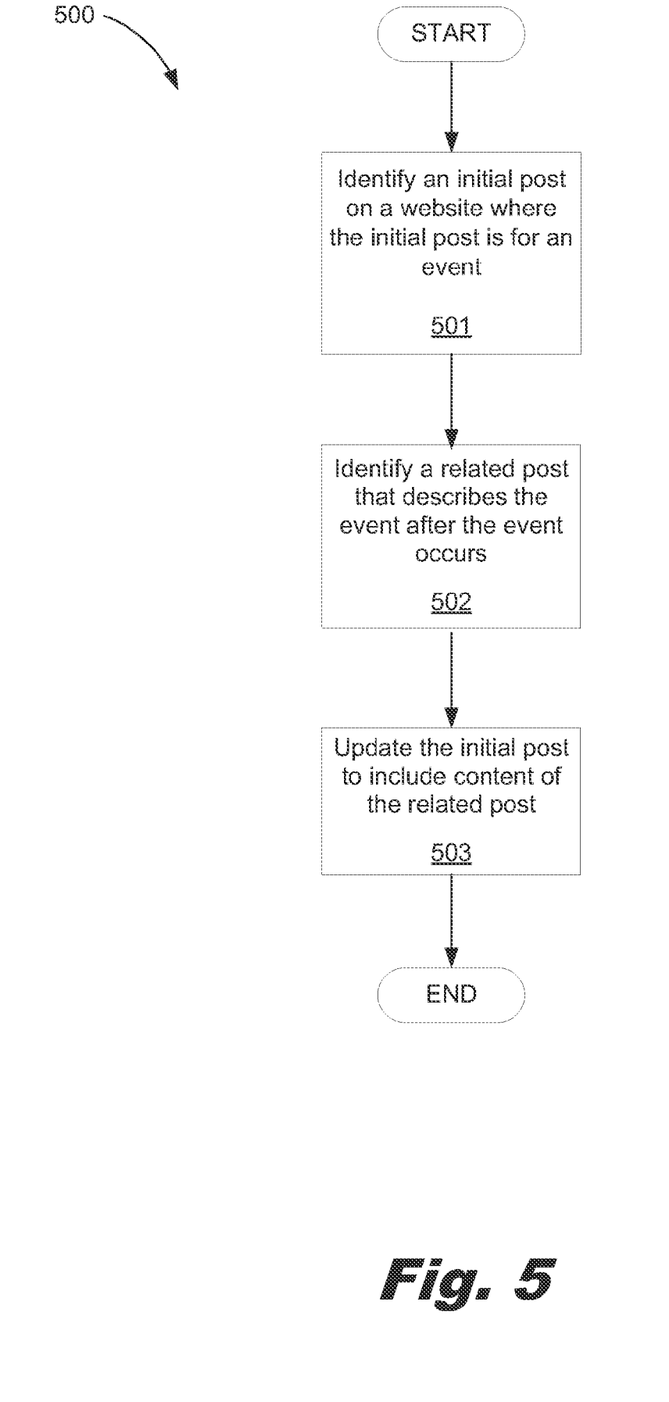
FIG. 5 is a flowchart of an example for managing an initial post on a website, according to principles described herein.

FIG. 5 is a flowchart of an example for managing an initial post on a website, according to principles described herein. The method (500) for managing an initial post on a website includes identifying (501) an initial post on a website where the initial post is for an event, identifying (502) a related post that describes the event after the event occurs, and updating (503) the initial post to include content of the related post.

As mentioned above, the method (500) includes identifying (501) an initial post on a website where the initial post is for an event. In one example, an initial post identification engine is used to identify an initial post on a website where the initial post is for an event. In this example, a user manually inputs the event information into a website. In this example, one initial post may identified by an initial post identification engine. In another example, multiple initial posts are identified by the initial post identification engine. In yet another example, the user clicks on an attending button for an event listed on a website to indicate the user is attending the event. As a result, the managing system identifies the user clicking on the attending button as an initial post. In still another example, a website may use hypertext markup language (HTML) in a header. In this example, the managing system may use the HTML in the header of the website to identify that a user making an initial post for an event. Further, the initial post identification engine may identify if the user's attitude in the initial post is positive, negative, or neural.

The method (500) further includes identifying (502) a related post that describes the event after the event occurs. In one example, a related post identification engine is used to monitor related post sources. In this example, the related post sources may include a social media website source, a blog source, an instant chat source, a forum source, other sources, and combinations thereof. In one example, the related post identification engine identifies one related post from the related post sources. In another example, the related post identification engine identifies multiple related posts from the related post sources. Further, the related post identification engine may identify if the user's attitude in the related post is positive, negative, or neural. As a result, a related post is identified (502) that describes the event after the event occurs.

The method (500) further includes updating (503) the initial post to include content of the related post. In one example, an updating engine is used to update an initial post to include content of a related post after an update date of the initial post expires. In one example, the style or word choices that a user may use to update their initial post may be included in the updated initial post. In this example, updating (503) the initial post includes referencing a user characteristic database. As will be describe below, the user characteristic database includes a user's favored words, favored style, favored n-grams, favored terms, favored numbers, favored structures from the field of natural process language, favored symbols, favored phrases, or combinations thereof. As a result, an initial post may be updated to include the style and word choice that a user may use to update their initial post.

In another example, the initial post is updated (503) by deleting the initial post and posting an updated initial post that includes the style and word choice that a user may use to update their initial post as well as content from the related post. In yet another example, the initial post is updated (503) by adding a comment to the initial post. In one example, the comment includes the style and word choice that a user may use to update their initial post as well as content from the related post.

Further, in one example, the initial post may be updated (503) by using one related post to update the initial post. In another example, the initial post may be updated (503) by using multiple related posts to update the initial post.

Figure 6:
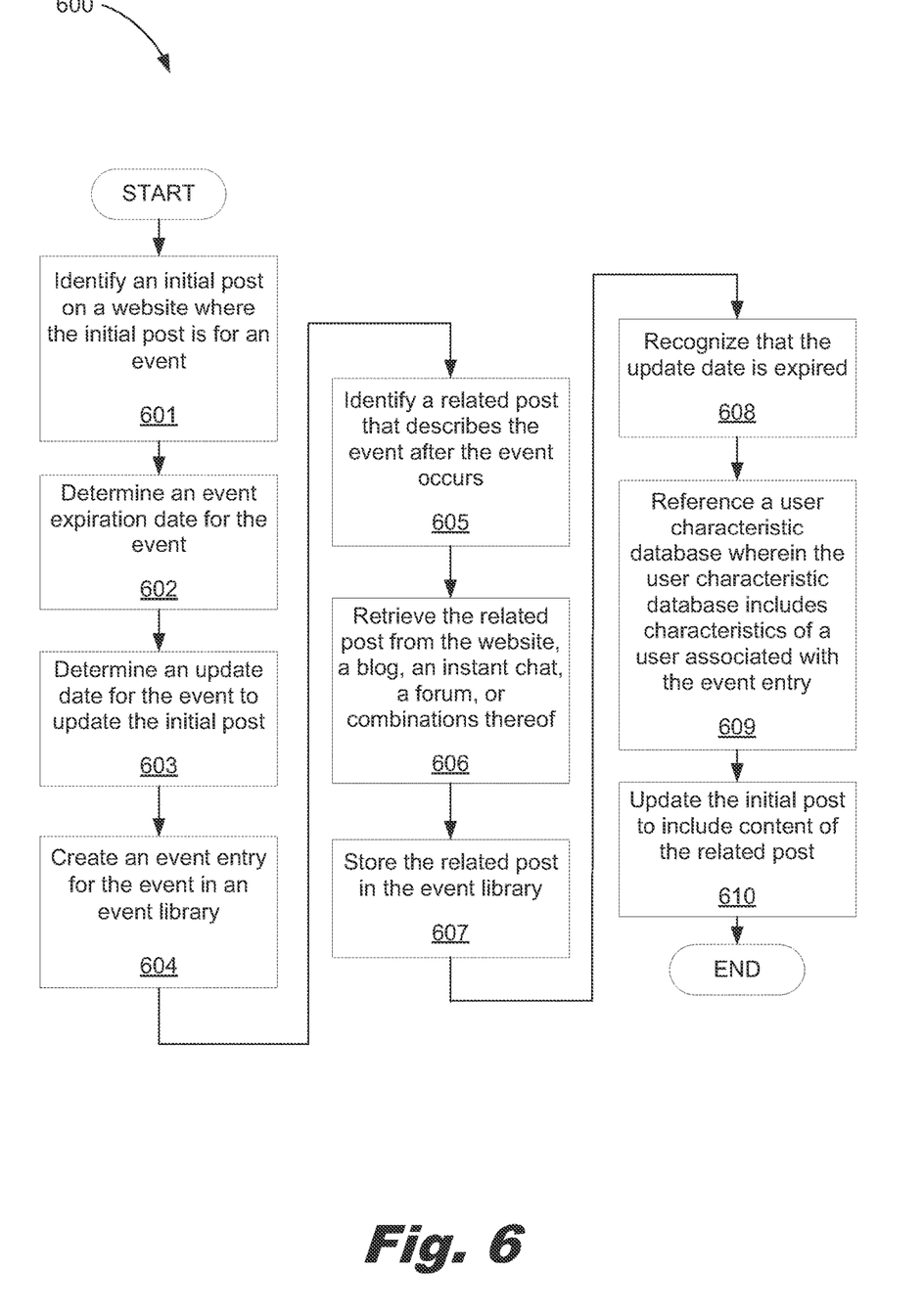
FIG. 6 is a flowchart of an example for managing an initial post on a website, according to principles described herein.

FIG. 6 is a flowchart of an example for managing an initial post on a website, according to principles described herein. The method (600) for managing an initial post on a website includes identifying (601) an initial post on a website where the initial post is for an event, determining (602) an event expiration date for the event, determining (603) an update date for the event to update the initial post, creating (604) an event entry for the event in an event library, identifying (605) a related post that describes the event after the event occurs, retrieving (606) the related post from the website, a blog, an instant chat, a forum, or combinations thereof, storing (607) the related post in the event library, recognizing (608) that the update date is expired, referencing (609) a user characteristic database wherein the user characteristic database includes characteristics of a user associated with the event entry, and updating (610) the initial post to include content of the related post.

As mentioned above, the method (600) includes determining (602) an event expiration date for the event. In one example, the expiration date may be a specific time of day. For example, 10:05 am May 12$^{th}$. In another example, the expiration date may be a general time in the day. For example, the end of June. In one example, the method (600) extracts the expiration date for the event from the initial post. In another example the expiration date is given by a user. Further, in one example the expiration date for the event may be determined by the type of event. For example, if the event is for a concert, the expiration date may be a few hours after the concert starts. In another example, if the event is for a business trip, the expiration date may be a weeks after the business trip starts.

The method (600) includes determining an update date for the event to update the initial post. In one example, the update date may be determine by the type of event. Further, an update date may be a specific time, such as midnight May $2^{nd}$. In another example, an update date may depend on the number of related posts. For example, if all the related posts have a positive user attitude towards the event, the update date may be after a second related post is made. In yet another example, an update date may be after one related post is identified. In still another example, an update date may be determined after a period of time when no related posts are identified.

Further, the method (600) includes creating (604) an event entry for the event in an event library stores the initial post in an event library. As mentioned above, the event library includes event entries for an initial post that include the event, the event location, the event date, the event expiration date, and an update date for the initial post. Further, the event library includes related posts that are associated with the initial post and contents of the related posts.

The method (600) further includes retrieving (606) the related post from the website, a blog, an instant chat, a forum, or combinations thereof. In one example, a related post retrieving engine retrieves a related post for an initial post. In this example, a related post may be retrieved from a social media website, a blog, a forum, an instant chat, or combinations thereof. In one example, the related post retrieving engine retrieves one related post for an initial post. In another example, the related post retrieving engine retrieves multiple related posts for an initial post.

The method (600) further includes storing (607) the related post in the event library. As mentioned above, the managing system may use an event library to store a related post. In another example, the related post may be stored on a user device. In yet another example, the related post may be stored on a server.

The method (600) further includes recognizing (608) that the update date is expired. In one example, a recognizing engine is used to recognize that an update date for an initial post is expired. In one example, the update date may be included in an initial post. In this example, the update date is stored in the event library. In another example, the update date is not included in the initial post. In this example, the update date for the initial post may have a default update date of one minute after a related post is identified.

The method (600) further includes referencing (609) a user characteristic database. As mentioned above the characteristic database includes characteristics of a user associated with the event entry. For example, the user characteristic database includes user's favored words, favored style, favored n-grams, favored terms, favored numbers, favored structures from the field of natural process language, favored symbols, favored phrases, or combinations thereof. As a result, an initial post may be updated to include the style and word choice that a user may use to update their initial post as well as the content of the related post.

Figure 7:
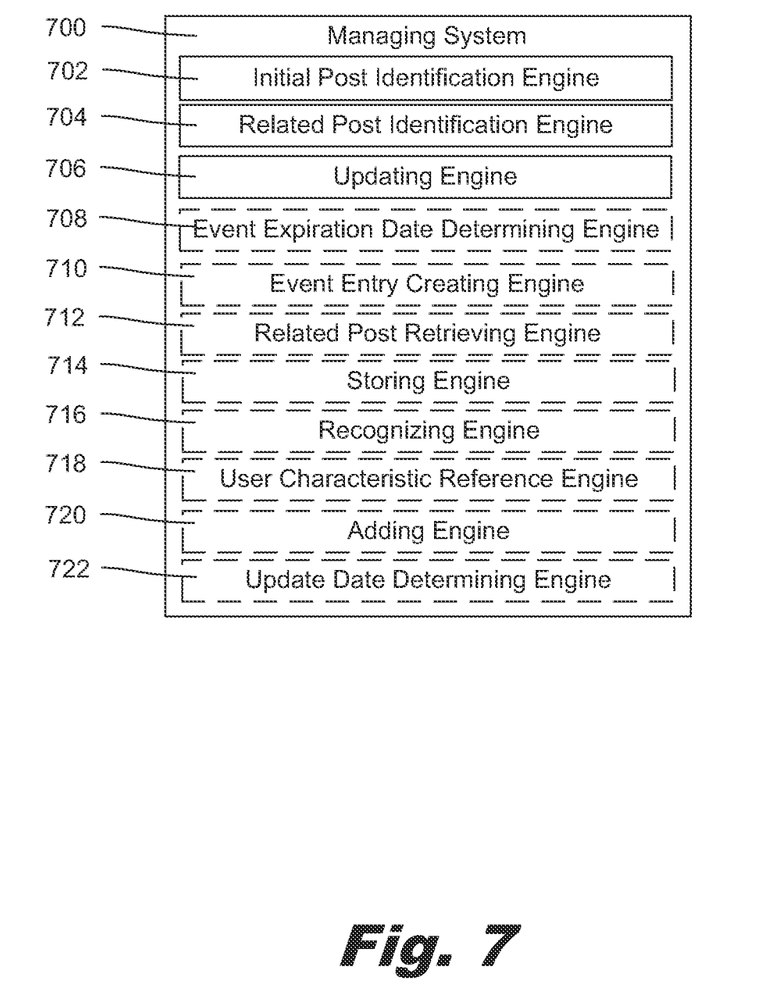
FIG. 7 is a diagram of an example of a managing system, according to the principles described herein.

FIG. 7 is a diagram of an example of a managing system (700), according to the principles described herein. The managing system (700) includes an initial post identification engine (702), a related post identification engine (704), and an updating engine (706). In this example, the system (700) also includes an event expiration date determining engine (708), an event entry creating engine (710), a related post retrieving engine (712), a storing engine (714), a recognizing engine (716), a user characteristics reference engine (718), and an adding engine (720), and an update determining engine (722). The engines (702, 704, 706, 708, 710, 712, 714, 716, 718, 720, 722) refer to a combination of hardware and program instructions to perform a designated function.

Each of the engines (702, 704, 706, 708, 710, 712, 714, 716, 718, 720, 722) may include a processor and memory. The program instructions are stored in the memory and cause the processor to execute the designated function of the engine.

The initial post identification engine (702) identifies an initial post for an event that will happen in the future. In one example, one initial post may identified by an initial post identification engine (702). In another example, multiple initial posts are identified by the initial post identification engine (702).

The related post identification engine (704) identifies at least one post related to the initial post after the expiration date for the initial post expires. As mentioned above, a related post may be a post that describes the event after the event occurs. In one example, the related post may be obtained from a number of websites. For example, a blog, a social media website, a forum, an instant chat website, other websites, or combinations thereof. Further, in one example, one related post may identified by the related post identification engine (704). In another example, multiple related posts are identified by the related post identification engine (704).

The updating engine (706) updates the initial post to include contents of the related post. In one example, updating the initial post may include updating the initial post to include a user's favored words, favored style, favored n-grams, favored terms, favored numbers, favored structures from the field of natural process language, favored symbols, favored phrases, or combinations thereof.

The event expiration date determining engine (708) determines an expiration date for an event. In one example, the expiration date may be a specific time in a day. For example, 10:05 am May $12^{th}$. In another example, the expiration date may be a general time in the day. For example, the end of June.

The event entry creating engine (710) creates an event entry. As mentioned above, event entries may include the event, the event location, the event date of the event, the expiration date for the initial post, related posts that are associated with the initial post, and contents of the related posts.

The related post retrieving engine (712) retrieves a related post for an initial post. In one example, a related post may be retrieved form a social media website, a blog, a forum, an instant chat, or combinations thereof.

The storing engine (714) stores the event entries in memory in the event library. For example, the storing engine (714) stores events, the event location, the event date of the event, the expiration date for the initial post, related posts that are associated with the initial post, and contents of the related post in memory in the event library.

The recognizing engine (716) recognizes that an update date for an initial post is expired. In one example, the update date may be included in an initial post. In this example, the update date is stored in the event library. In another example, the update date is not included in the initial post. In this example, the update date for the initial post may have a default update date of one minute after a related post is identified.

The user characteristics reference engine (718) references a user's characteristics database. In one example, the a user's characteristics database may contain a user's favored words, favored style, favored n-grams, favored terms, favored numbers, favored structures from the field of natural process language, favored symbols, favored phrases, or combinations thereof.

The adding engine (720) adds a related post to the initial post. In one example, the initial post may be updated to add the style and word choice that a user may use to their initial post.

The update date determining engine (722) determines an update date for an event. In one example, the update date may be a specific time in a day. For example, 10:05 pm May 20$^{th}$. In another example, the update date may depend on the number of related posts that are identified. For example, the update date is after three related posts are identified.

Figure 8:
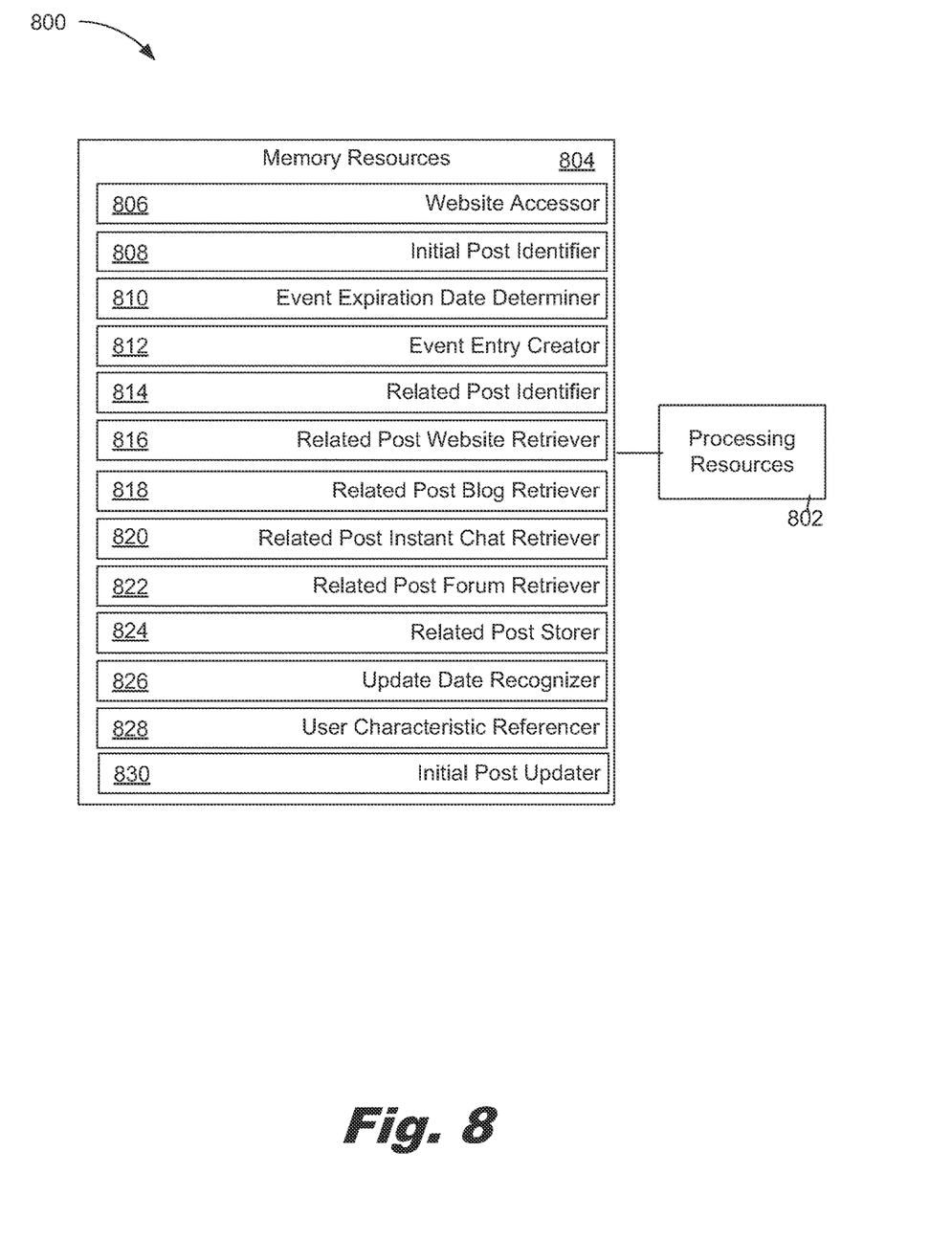
FIG. 8 is a diagram of an example of a managing system, according to the principles described herein.

FIG. 8 is a diagram of an example of a managing system (800), according to the principles described herein. In this example, the managing system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the managing system (800). The programmed instructions shown stored in the memory resources (804) include a website accessor (806), an initial post identifier (808), an event expiration date determiner (810), an event entry creator (812), a related post identifier (814), a related post website retriever (816), a related post blog retriever (818), a related post instant chat retriever (820), a related post forum retriever (822), a related post storer (824), a update date recognizer (826), a user characteristics referencer (828), an initial post updater (830).

The memory resources (804) include a computer readable storage medium that contains computer readable program code to cause tasks to be executed by the processing resources (802). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The website accessor (806) represents programmed instructions that, when executed, cause the processing resources (802) to access a website. The initial post identifier (808) represents programmed instructions that, when executed, cause the processing resources (802) to identify an initial post. The event expiration date determiner (810) represents programmed instructions that, when executed, cause the processing resources (802) to determine an expiration date of an event. The event entry creator (812) represents programmed instructions that, when executed, cause the processing resources (802) to create an event entry for an initial post. The related post identifier (814) represents programmed instructions that, when executed, cause the processing resources (802) to identify a post related to the initial post.

The related post website retriever (816) represents programmed instructions that, when executed, cause the processing resources (802) to retrieve a related post from a website. The related post blog retriever (818) represents programmed instructions that, when executed, cause the processing resources (802) to retrieve a related post from a blog. The related post instant chat retriever (820) represents programmed instructions that, when executed, cause the processing resources (802) to retrieve a related post from an instant chat. The related post forum retriever (822) represents programmed instructions that, when executed, cause the processing resources (802) to retrieve a related post from a forum.

The related post storer (824) represents programmed instructions that, when executed, cause the processing resources (802) to store the related post in an event library. The update date recognizer (826) represents programmed instructions that, when executed, cause the processing resources (802) to recognize that an update date for an event has expired. The user characteristics referencer (828) represents programmed instructions that, when executed, cause the processing resources (802) to reference a user characteristics database. The initial post updater (830) represents programmed instructions that, when executed, cause the processing resources (802) to update an initial post to include contents of a related post.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries, may be accessed from a remote location over a network connection while the programmed instructions are located locally. Thus, the managing system (800) may be implemented on a user device, on a server, on a collection of servers, or combinations thereof.

The managing system (800) of FIG. 8 may be part of a general purpose computer. However, in alternative examples, the managing system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A computer program product for managing an initial post on a website, comprising:
   a non-transitory computer readable storage medium, said tangible computer readable storage medium comprising computer readable program code embodied therewith, said computer readable program code comprising program instructions that, when executed, causes a processor to:
      identify an initial post for an event on a website, wherein said initial post is input by a user;
      identify, after an expiration date for the event, a related post from a different post source than the initial post by referencing an event library to determine that said related post is related to said initial post, wherein:
         said related post describes said event after said event occurs;
         said event library comprises an event entry related to the initial post; and
         said event entry comprises an event location, event date, and event expiration date;
      identify a user's attitude in the related post towards the event; and
      update said initial post to include content of said related post in a style and word choice of the user.

2. The computer program product of claim 1, further comprising computer readable program code comprising program instructions that, when executed, causes said processor to create an event entry for said event in an event library.

3. The computer program product of claim 2, further comprising computer readable program code comprising program instructions that, when executed, causes said processor to associate said event entry with said event, an event location, an event date, an event expiration date, said related post, contents of said related post, an update date or combinations thereof.

4. The computer program product of claim 1, further comprising computer readable program code comprising program instructions that, when executed, causes said processor to:
   retrieve said related post from said website, a blog, an instant chat, a forum, or combinations thereof; and
   store said related post in said event library.

5. The computer program product of claim 1, further comprising computer readable program code comprising program instructions that, when executed, causes said processor to reference a user characteristic database wherein said user characteristic database includes characteristics of a user associated with said event entry.

6. The computer program product of claim 5, wherein said user characteristic database includes a number of user favored words, favored style, favored n-grams, favored terms, favored numbers, favored structures from the field of natural process language, favored symbols, favored phrases, or combinations thereof.

7. The computer program product of claim 1, further comprising computer readable program code comprising program instructions that, when executed, causes said processor to determine an event expiration date for said event and determine an update date to update said initial post.

8. The computer program product of claim 7, further comprising computer readable program code comprising program instructions that, when executed, causes said processor to recognize that said update date is expired.

9. A system for managing an initial post on a website, the system comprising:
   an initial post identification engine to identify an initial post for a future event to a website wherein said initial post:
      is input by a user; and
      includes the event, an event location, an event date, and an event expiration date;
   an event expiration date determining engine to determine an expiration date for said event;
   an update date determining engine to determine an update date for said event based on a related post, which related post is from a different post source than the initial post;
   a related post identification engine to identify the related post by said user that describes said event after said event occurs by referencing an event library to determine that said related post is related to said initial post, wherein:
      said related post describes the event after the event has occurred;
      said event library comprises an event entry related to the initial post; and
      said event entry comprises an event location, event date, and event expiration date;
   a recognizing engine to recognize that said update date is expired; and
   an updating engine to update said initial post to include content of said related post that describes the event after the event has occurred when said update date is expired, wherein said update engine updates:
      said initial post with the style and word choice that said user used in said initial post; and
      a verb tense of said initial post.

10. The computer program product of claim 1, further comprising computer readable program code comprising program instructions that, when executed, causes the processor to determine whether another post by the user is related to the initial post.

11. The computer program product of claim 1, further comprising computer readable program code comprising program instructions that, when executed, causes said processor to, response to determining that the event expiration date for the event is expired, monitor other posts made by the user to determine if the other posts are related to the initial post.

12. The system of claim 9, further comprising a related post retrieving engine to retrieve said related post from said website, a blog, an instant chat, a forum, or combinations thereof.

13. The system of claim 9, further comprising a storing engine to store said related post in said event library.

14. The system of claim 9, further comprising a user characteristic reference engine to reference a user characteristic database wherein said user characteristic database includes characteristics of a user associated with said event entry.

15. The system of claim 14, wherein said user characteristic database includes an adding engine to add a number of user favored words, favored style, favored n-grams, favored terms, favored numbers, favored structures from the field of natural process language, favored symbols, favored phrases, or combinations.

16. The system of claim 15, wherein updating said initial post to include content of said related post comprises an adding engine to add said user favored words, said favored style, said favored n-grams, said favored terms, said favored numbers, said favored structures from the field of natural process language, said favored symbols, said favored phrases, or combinations to said initial post.

17. The system of claim 9, wherein the update date is determined based on a number of related posts.

18. The system of claim 9, wherein the update date is included in the initial post.

* * * * *